Patented Dec. 16, 1930

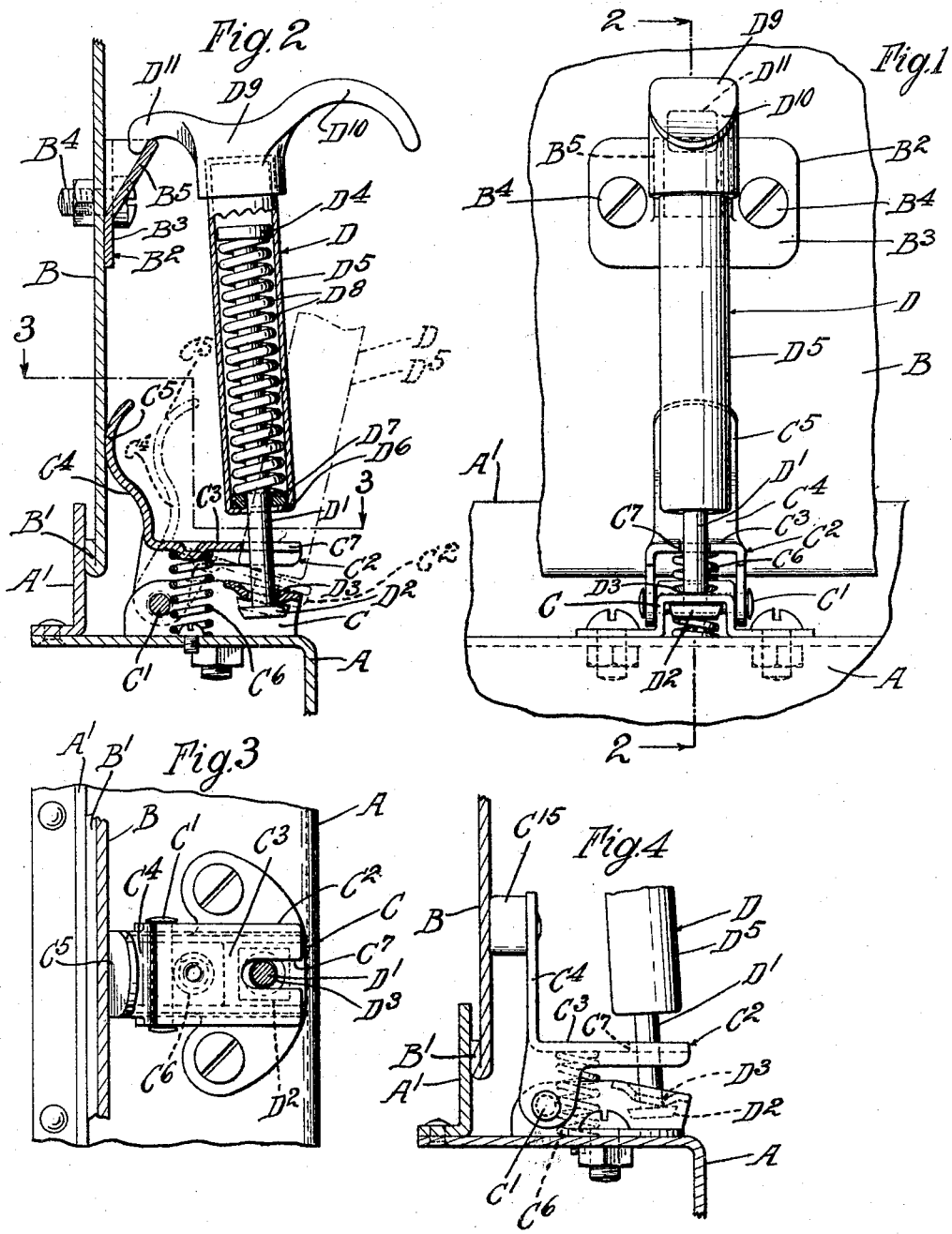

1,784,931

UNITED STATES PATENT OFFICE

CHARLES B. GILMORE, OF CHICAGO, ILLINOIS, ASSIGNOR TO CHICAGO FORGING & MANUFACTURING COMPANY, OF CHICAGO, ILLINOIS, A CORPORATION OF ILLINOIS

HOOD LATCH

Application filed July 14, 1928. Serial No. 292,641.

My invention relates to a hood latch or clamp for automobile closures and has for one purpose to provide such a clamp which will be cheap to manufacture and simple and efficient to operate. Another object is the provision of such a clamp which shall direct pressure both downwardly and inwardly against the lower edge of an automobile closure or hood. Other objects will appear from time to time.

I illustrate my invention more or less diagrammatically in the accompanying drawings, wherein—

Figure 1 is a side elevation;

Figure 2 is a section on the line 2—2 of Figure 1;

Figure 3 is a section on the line 3—3 of Figure 2; and

Figure 4 is a partial section, similar to Figure 2, of a variant form of my device.

Like parts are indicated by like symbols throughout the specification and drawings.

A generally indicates a longitudinal automobile frame member, upon which is mounted any suitable closure abutment $A^1$.

B indicates the lower edge of the automobile hood the bottom $B^1$ of which normally engages the outer side of the abutment $A^1$, when in closed position. $B^2$ generally indicates a clamp engaging or receiving member herein shown as including the plate $B^3$ secured by the bolts $B^4$ and supporting the outer bracket or abutment extension $B^5$.

C generally indicates a base member for the latch. Pivoted to it as at $C^1$ is the bell crank lever $C^2$ having the generally horizontal arm $C^3$ and the generally vertical arm $C^4$ and the hood engaging portion $C^5$. $C^6$ indicates a compression spring tending normally to so rotate the bell crank lever as to thrust the head engaging portion $C^5$ laterally inwardly against the face of the hood. The arm $C^3$ is notched or apertured as at $C^7$.

Further mounted on the base member C is a second latch assembly generally indicated as D and including a stem $D^1$ with its bottom enlargement $D^2$ passing through the aperture $D^3$ on the base member C to provide a swivel connection. The upper end of the pin $D^1$ is provided with a head $D^4$. $D^5$ indicates a latch cylinder which is inwardly turned at the bottom as at $D^6$ in order to secure the washer $D^7$. Compressed between the washer $D^7$ and the head $D^4$ is the coil spring $D^8$ which tends normally to move the latch member $D^5$ downwardly along the pin $D^1$. $D^9$ indicates any suitable head or top member for the latch cylinder $D^5$, including the finger or handle member $D^{10}$ and the hook member $D^{11}$ adapted to engage the abutment $B^5$.

It will be realized that whereas I have described and shown a practical and operative device, nevertheless many changes might be made in size, shape, number and disposition of parts without departing from the spirit of my invention. I therefore wish my description and drawings to be taken as in a broad sense illustrative and diagrammatic rather than as limiting me to my specific showing.

The use and operation of my invention are as follows:

I provide two normally independent latch members one directing pressure inwardly against the bottom of the hood and the other directing pressure downwardly against the lower edge of the hood latch. The second member holds the hood downwardly in place and the first member, by thrusting it inwardly against the abutment $A^1$, prevents rattle. In normal operation of the device, and during operative connection, the two members are entirely independent, the coil springs $C^6$ and $D^8$ respectively operating independently to thrust the lever $C^4$ in and to draw the latch hook element $D^{11}$ down. However, when the operator releases the hood by lifting the handle $D^{10}$ and releasing the hook $D^{11}$, he normally releases the handle $D^{10}$ thereafter and permits it to move downwardly along the pin $D^1$ in response to the expansion of the spring $D^8$. When the latch $D^5$ is thus downwardly moved it engages the lever arm $C^3$ and withdraws its associated lever arm $C^4$ into the dotted line position shown in Figure 2. Thus although the two latch elements are in operation independent, while the hood is closed, when the downwardly acting latch is released it immediately moves to position to withdraw the inwardly acting latch.

As illustrated in Figure 4, the lever arm $C^2$ may have mounted upon the vertical arm $C^4$ a separate contact member $C^{15}$ of any suitable material.

I claim:

1. In a hood latch for automobile hood closures, the combination of a down clamp element adapted to exert a thrust downwardly against the hood, and a lateral thrust element adapted to exert a thrust laterally against the hood, the two being independent in their operation during their simultaneous operative connection with the closure, and means associated with the down clamp element for withdrawing the lateral thrust element from operative engagement with the hood in response to movement of the down clamp element after its release.

2. In a hood latch for automobile hood closures, a down clamp element adapted to exert a thrust downwardly against said hood, said element including a base member, a stem movably mounted on said base member, a latch slidable on said stem and yielding means normally tending to thrust said latch downwardly along said stem, and a lateral thrust element, separately mounted adjacent the hood and adapted to exert a thrust laterally against the hood and means for withdrawing the lateral thrust element from operative engagement with the hood in response to the movement of the latch member downwardly along said stem.

3. In a hood latch for automobile hood closures, a down clamp element adapted to exert a thrust downwardly against said hood, said element including a base member, a stem movably mounted on said base member, a latch slidable on said stem and yielding means normally tending to thrust said latch downwardly along said stem, and a lateral thrust element, separately mounted adjacent the hood and adapted to exert a thrust laterally against the hood and means for withdrawing the lateral thrust element from operative engagement with the hood in response to the movement of the latch member downwardly along said pin, the lateral thrust member being in the form of a bell crank lever, one of the arms thereof being opposed to the face of the hood closure, the other being in the line of downward movement of the latch member.

4. In a hood latch for automobile hood closures, in combination, a lateral thrust element and means tending normally to thrust said lateral element against the hood, a down clamp element, mounted independently of said lateral thrust element, and adapted to exert a thrust downwardly against the hood, and means for withdrawing the lateral thrust element from the hood in response to movement of the down clamp element after the release of the down clamp element from operative engagement with the hood.

Signed at Chicago, county of Cook and State of Illinois, this 23 day of June, 1928.

CHARLES B. GILMORE.